(12) United States Patent
Li et al.

(10) Patent No.: US 10,354,139 B1
(45) Date of Patent: Jul. 16, 2019

(54) GENERATING AND UTILIZING SPATIAL AFFORDANCES FOR AN OBJECT IN ROBOTICS APPLICATIONS

(71) Applicant: X Development LLC, Mountain View, CA (US)

(72) Inventors: Adrian Li, San Francisco, CA (US); Nicolas Hudson, San Mateo, CA (US); Aaron Edsinger, Port Costa, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 15/724,067

(22) Filed: Oct. 3, 2017

Related U.S. Application Data

(60) Provisional application No. 62/555,525, filed on Sep. 7, 2017.

(51) Int. Cl.
| | |
|---|---|
| G06K 9/00 | (2006.01) |
| G06N 20/00 | (2019.01) |
| B25J 9/16 | (2006.01) |
| G06T 7/73 | (2017.01) |

(52) U.S. Cl.
CPC .......... *G06K 9/00664* (2013.01); *B25J 9/163* (2013.01); *B25J 9/1697* (2013.01); *G06N 20/00* (2019.01); *G06T 7/74* (2017.01); *B25J 9/1633* (2013.01); *B25J 9/1651* (2013.01); *B25J 9/1669* (2013.01); *G06T 2207/20076* (2013.01); *G06T 2207/20081* (2013.01); *Y10S 901/47* (2013.01)

(58) Field of Classification Search
CPC ... G06K 9/00664; G06N 20/00; B25J 9/1697; B25J 9/163; B25J 9/1633; B25J 9/1651; B25J 9/1669; G06T 7/74; G06T 2207/20076; G06T 2207/20081; Y10S 901/47
See application file for complete search history.

(56) References Cited

U.S. PATENT DOCUMENTS

| | | | |
|---|---|---|---|
| 9,616,568 B1 * | 4/2017 | Russell | B25J 19/02 |
| 9,914,213 B2 * | 3/2018 | Vijayanarasimhan | G06N 3/008 |

OTHER PUBLICATIONS

Nguyen et al. "Detecting Object Affordances with Convolutional Neural Networks." IEEE/RSJ International Conference on Intelligent Robots and Systems, Oct. 9, 2016, pp. 2765-2770 (Year: 2016).*

(Continued)

*Primary Examiner* — Jon Chang
(74) *Attorney, Agent, or Firm* — Middleton Reutlinger

(57) ABSTRACT

Methods, apparatus, systems, and computer-readable media are provided for generating spatial affordances for an object, in an environment of a robot, and utilizing the generated spatial affordances in one or more robotics applications directed to the object. Various implementations relate to applying vision data as input to a trained machine learning model, processing the vision data using the trained machine learning model to generate output defining one or more spatial affordances for an object captured by the vision data, and controlling one or more actuators of a robot based on the generated output. Various implementations additionally or alternatively relate to training such a machine learning model.

20 Claims, 11 Drawing Sheets

(56) References Cited

OTHER PUBLICATIONS

Kim et al. "Semantic Labeling of 3D Point Clouds with Object Affordance for Robot Manipulation." IEEE International Conference on Robotics and Automation, May 7, 2014, pp. 5578-5584 (Year: 2014).*

Ugur et al. "Unsupervised Learning of Object Affordances for Planning in a Mobile Manipulation Platform." IEEE International Conference on Robotics and Automation, May 9, 2011, pp. 4312-4317 (Year: 2011).*

Sawatzky et al. "Weakly Supervised Affordance Detection." IEEE Conference on Computer Vision and Pattern Recognition, Jul. 21, 2017, pp. 5197-5206 (Year: 2017).*

Desai et al. "Predicting Functional Regions of Objects." IEEE Conference on Computer Vision and Pattern Recognition Workshops, Jun. 23, 2013, pp. 968-975 (Year: 2013).*

Fitzpatrick et al. (Sep. 2003). Learning about objects through action-initial steps towards artificial cognition. In Robotics and Automation, 2003. Proceedings. ICRA'03. IEEE International Conference on (vol. 3, pp. 3140-3145). IEEE.

Atil et al. (2010). Affordances and Emergence of Concepts. In 10th International Conference on Epigenetic Robotics; 8 pages.

Metta et al. (2010). The iCub Humanoid Robot: An Open-Systems Platform for Research in Cognitive Development. Neural Networks, 23(8), 1125-1134.

\* cited by examiner

REGION₁ =
{<AFFORDANCE₁ PROBABILITY>, <AFFORDANCE₁ APPLICATION PARAMETER>; ... <AFFORDANCE_N PROBABILITY>, <AFFORDANCE_N APPLICATION PARAMETER>}
...
REGION_N =
{<AFFORDANCE₁ PROBABILITY>; <AFFORDANCE₁ APPLICATION PARAMETER>; ... <AFFORDANCE_N PROBABILITY>; <AFFORDANCE_N APPLICATION PARAMETER>}

682A

GENERATING AND UTILIZING SPATIAL AFFORDANCES FOR AN OBJECT IN ROBOTICS APPLICATIONS

BACKGROUND

Some robots and/or robot control systems utilize one or more techniques to detect and/or localize various objects in the robot's environment. For example, techniques have been proposed for utilizing vision data (e.g., point cloud data) captured by a vision component (e.g., camera, laser scanner) of a robot to classify objects in an environment of the robot and to estimate a pose (position and orientation) of the object in the environment. The classification of an object according to such techniques classifies the entire object into a particular category selected from a taxonomy of categories.

SUMMARY

The present disclosure is generally directed to methods, apparatus, and computer-readable media (transitory and non-transitory) for generating spatial affordances for an object, that is in an environment of a robot, and utilizing the generated spatial affordances in one or more robotics applications directed to the object. More particularly, various implementations disclosed herein relate to applying vision data as input to a trained machine learning model, processing the vision data using the trained machine learning model to generate output defining one or more spatial affordances for an object captured by the vision data, and controlling one or more actuators of a robot based on the generated output. Various implementations additionally or alternatively relate to training such a machine learning model.

As used herein, a "spatial affordance" for an object defines a corresponding spatial region for the object, as well as a corresponding affordance for the corresponding spatial region. The "spatial affordance" for the object can also optionally define one or more affordance application parameters for the corresponding affordance for the corresponding spatial region, and/or a corresponding probability that the corresponding affordance is achievable for the corresponding spatial region.

As used herein, an "affordance" indicates a robotic action that can be performed on an object. Some non-limiting examples of affordances include lift, rotate, push, pull, open, close, grasp, pour, and slide. Examples of affordances also include more granularly defined affordances such as fingertip/pinch grasp, power grasp, and raking grasp (in lieu of or in addition to the less granular "grasp" affordance). Further, examples of affordances also include an ordered or unordered collection of affordances such as "rotate, then slide", "push, then pull", etc. In some implementations, each affordance is mapped to corresponding action planner(s), rule(s), and/or other components utilized to effectuate performance of the affordance by the robot. A robot control system of the robot can utilize such a mapping to select action planner(s), rule(s), and/or other component(s) for utilization in performance of an affordance of a selected spatial affordance. In utilizing the action planner(s), rule(s), and/or other component(s) to effectuate performance of an affordance of a selected spatial affordance, the robot control system can further utilize a spatial region and/or an affordance application parameter of the selected spatial affordance to tailor performance of the affordance to the spatial region and/or affordance application parameter.

As used herein, a "spatial region" indicates a determinable area of an object, and can be defined with reference to pixel(s) and/or voxel(s) of vision data that captured the object—and/or with reference to an area in a multi-dimensional space utilized by a robot. In many implementations, a spatial region defined by a spatial affordance is a subset of the entire region/area of the object. In those and other implementations, a spatial region is defined with reference to one or more vision data points such as one or more pixels (e.g., a single pixel or a collection of neighboring pixels) and/or one or more voxels (e.g., a single voxel or a collection of neighboring voxels). The pixels and/or voxels indicated by the spatial region directly or indirectly indicate the corresponding area of the object, thereby enabling an end effector and/or other component of the robot to interact with the corresponding area indicated by the spatial region. For example, a spatial region may indicate a pixel of a two-and-a-half dimensional image, where the pixel indicates an X, Y, and Z coordinate that can be mapped to a particular point in space that corresponds to a point on the object (e.g., a particular point in joint space, Cartesian space, or other multi-dimensional space utilized by a robot).

As used herein, an "affordance application parameter" can define one or more particular parameters for a corresponding affordance and corresponding spatial region, such as one or more directions and/or magnitudes of the affordance. For example, for a "push" affordance for a spatial region, an affordance application parameter can include: a direction (or a range of directions) for the push (e.g., a directional vector in a multi-dimensional space) and/or a magnitude (or range of magnitudes) for the push (e.g., an amount of force for the push, a velocity for the push, an acceleration for the push). Also, for example, for a "push" affordance for a spatial region, an affordance application parameter can include an approach pose of an end effector for the affordance (e.g., a desired 6D pose for the end effector at the start of the affordance). As yet another example, an affordance application parameter can include a path (sequence of poses) or a trajectory (sequence of poses with velocities, accelerations, etc.) for the affordance.

As described above, in some implementations, a spatial region defined by a spatial affordance is a subset of the entire region of an object. In some of those implementations, multiple spatial affordances are generated for an object, including: a first spatial affordance that defines a first spatial region; and a second spatial affordance that defines a second spatial region. The first spatial region and the second spatial region can be distinct (e.g., non-overlapping) regions. Moreover, the first spatial affordance and the second spatial affordance can define unique affordances, probabilities, and/or affordance application parameters relative to one another. For example, the first spatial affordance can define an affordance of "push", and the second spatial affordance can define an affordance of "pull". Moreover, the generated multiple spatial affordances may not define a "push" affordance for the second spatial region (e.g., may not define at least a threshold probability for the "push" affordance for the second spatial region) and/or may not define the "pull" affordance for the first spatial region (e.g., may not define at least a threshold probability for the "pull" affordance for the first spatial region). In these and other manners, multiple unique spatial affordances are generated for an object. This can enable selection of one or more particular spatial affordances based on conformance of those particular spatial affordances to a target affordance, and/or based on other parameters of those particular spatial affordances (e.g., based on probabilities and/or affordance application parameters). One or more actuators of the robot can then be controlled to cause component(s) of the robot to interact particularly with a spatial region defined by one of the selected spatial affordances, to thereby achieve the target affordance through interaction of the robotic component(s) with the object.

Accordingly, implementations described herein can enable tailoring of robot control to achieve an affordance to not only an object level, but more particularly to a spatial region level. This can increase the likelihood that robotic actions that are directed toward an object to achieve a target affordance, will indeed result in achievement of the target affordance. Moreover, implementations described herein can additionally enable tailoring of robot control in conformity with an affordance application parameter that is tailored to a corresponding affordance and corresponding spatial region. This can also increase the likelihood that robotic actions that are directed toward an object to achieve a target affordance, will indeed result in achievement of the target affordance.

Further, in implementations where output defining the spatial affordances is generated directly by processing of vision data using a trained machine learning model, the output can be directly utilized to efficiently select spatial region(s) and/or affordance application parameter(s) for interaction to achieve a target affordance. This can enable an action planner and/or other component(s) to generate an appropriate action for the target affordance, while using one or more constraints that are based on the selected spatial region(s) and/or affordance application parameter(s). Such constraint(s) can increase the efficiency of the action planner relative to action planning where no spatial region constraints (or less granular spatial region constraints) and/or no affordance application parameters (or less granular affordance application parameters) are utilized.

As one non-limiting example of various techniques described herein, assume vision data that is generated based on output from vision sensor(s) of a vision component robot, and that the vision data captures at least a portion of a door in the environment of the robot. Further assume the captured portion of the door includes a rotatable handle, and a flat portion that surrounds the rotatable handle. The vision data can be applied as input to a trained machine learning model that is trained to predict spatial affordances. The vision data can be processed using the trained machine learning model to generate output that defines multiple spatial affordances for the door.

For example, the generated multiple spatial affordances can include: (1) a first spatial affordance that defines: a first spatial region that corresponds to at least a portion of the handle; a first affordance of "open/rotate, then pull", and a probability value of 0.9; (2) a second spatial affordance that defines: the first spatial region that corresponds to the portion of the handle; a second affordance of "close/push", and a probability value of 0.5; and (3) a third spatial affordance that defines: a second spatial region that corresponds to at least a portion of the flat portion; the second affordance of "close/push", and a probability value of 0.9. If a target affordance of the robot is "close" (e.g., a higher level task planner has instructed the robot to close the door), the third spatial affordance can be selected based on the third spatial affordance defining a second affordance that conforms to the target affordance, and based on it having a probability (0.9) that is greater than the probability (0.5) of the second spatial affordance (that also defines the second affordance that conforms to the target affordance). One or more actuators of the robot can then be controlled to cause an end effector and/or other component of the robot to "push" the door based on one or more points of the second spatial region defined by the selected third spatial affordance. For example, one or more points of the second spatial region can be provided as a target point to a motion planner of the robot, and the motion planner can generate a trajectory that causes the end effector of the robot to contact, and apply a pushing force to, the target point (optionally with a direction and/or magnitude that can also optionally be defined by the third spatial affordance). As another example, surface normal(s) of the second spatial region can be utilized to determine an approach vector for an end effector of the robot, and the approach vector followed by the end effector of the robot in applying a pushing force to all or portions of the second spatial region.

As described herein, in some implementations each of the spatial regions defined by spatial affordances of output can define a corresponding single pixel or voxel, or a corresponding contiguous collection of pixels or voxels. As one example, the vision data applied to the machine learning model can be three-dimensional ("3D") vision data, such as a voxel map have dimensions of 256×256×256, with N channels. For instance, each voxel in the voxel map can define (directly or indirectly) an area in three-dimensional (3D) space via its dimensional position and defines, via the N channels: one or more properties for that area (e.g., occupied/unoccupied, color value(s)). In such an example, the output generated utilizing the machine learning model can have dimensions of 256×256×256, with M channels. For instance, each 1×1×1×M "stack" can define an area in 3D space (the spatial region) via its dimensional position in the output and define, via the M channels: affordance(s) and, optionally corresponding probability/probabilities and/or corresponding affordance application parameter(s) (e.g., a first of the M channels can define a probability of a first affordance, a second of the M channels can define a probability of a second affordance, etc.). In such an example, there is a one-to-one correspondence between the granularity of the areas defined by the vision data and the spatial regions defined by the output. In other words, the output defines whether affordance(s) are present or not, and/or parameters for the affordance(s), for each of the voxels of the vision data. In other implementations, a non-one-to-one correspondence can be utilized. For example, the output can instead have dimensions of 64×64×64, with M channels—where each 1×1×1×M "stack" corresponds to neighboring 4×4×4 voxels of the vision data.

In some implementations, a method may be provided that includes receiving vision data and applying the vision data as input to at least one trained neural network model. The vision data is generated based on output from one or more vision sensors of a vision component of a robot, and the vision data captures an object in an environment of the robot. The method further includes processing the vision data using the trained neural network model to generate output defining multiple spatial affordances for the object in the environment. The processing of the vision data is based on trained parameters of the trained neural network model, and the output is generated directly by the processing of the vision data using the trained neural network model. The output defines a first spatial affordance and a second spatial affordance, of the multiple spatial affordances for the object. The first spatial affordance defines: a first spatial region of the object, and a first affordance for the first spatial region of the object. The second spatial affordance defines: a second spatial region of the object, and a second affordance for the second spatial region of the object. The first spatial region and the second spatial region are distinct regions of the object, and the first affordance is not defined for the second spatial region by the generated spatial affordances. The method further includes: determining that the second affordance is a target affordance for the object; and based on the second affordance being the target affordance and being defined for the second spatial region, controlling one or more actuators of the robot to cause one or more components of the robot to interact with the second spatial region of the object.

This method and other implementations of technology disclosed herein may each optionally include one or more of the following features.

In some implementations, the vision data includes a plurality of pixels or voxels, and wherein the first spatial region defines a first pixel or first voxel of the plurality of pixels or voxels and the second spatial region defines a second pixel or voxel of the plurality of pixels or voxels. In some versions of those implementations, the first spatial region defines only the first pixel or voxel and the second spatial region defines only the second pixel or voxel. In some other version of those implementations, the first spatial region defines a first collection of contiguous pixels or voxels that include the first pixel or voxel, and the second spatial region defines a second collection of contiguous pixels or voxels that include the first pixel or voxel and that exclude the second pixel or voxel.

In some implementations, the first spatial affordance further defines an affordance application parameter for the first affordance for the first spatial region. In some of those implementations, the affordance application parameter defines at least one magnitude of force to be applied in performance of the first affordance for the first spatial region. In some of those implementations, the affordance application parameter additionally or alternatively defines at least one magnitude of velocity to be applied in performance of the first affordance for the first spatial region. In some of those implementations, the affordance application parameter additionally or alternatively defines at least one magnitude of acceleration to be applied in performance of the first affordance for the first spatial region. In some of those implementations, the affordance application parameter additionally or alternatively defines a path or trajectory to be applied in performance of the first affordance for the first spatial region.

In some implementations, the output further defines a third spatial affordance of the multiple spatial affordances for the object. In some of those implementations, the third spatial affordance defines: the first spatial region of the object, and a third affordance for the first spatial region of the object.

In some implementations, the second spatial affordance defines the second affordance for the second spatial region based on the output including a probability, that corresponds to the second spatial region and to the second affordance, satisfying a first threshold. In some of those implementations, controlling the one or more actuators of the robot to cause one or more components of the robot to interact with the second spatial region of the object is further based on determining that the probability satisfies one or more criteria relative to other probabilities that correspond to other spatial regions and to the second affordance.

In some implementations, the first affordance is not defined for the second spatial region by the generated spatial affordances based on the output including a probability, that corresponds to the second spatial region and to the first affordance, failing to satisfy a threshold.

In some implementations, the trained neural network model is a feed forward neural network model comprising a plurality of convolution layers.

In some implementations, a method may be provided that includes receiving vision data and applying the vision data as input to at least one trained machine learning model. The vision data is generated based on output from one or more vision sensors of a vision component viewing an object in an environment of a robot. The method further includes processing the vision data using the trained machine learning model to generate output defining at least one spatial affordance for the object in the environment. The processing of the vision data is based on trained parameters of the trained machine learning model, and the output is generated directly by the processing of the vision data using the trained machine learning model. The spatial affordance defines: a spatial region of the object, an affordance for the spatial region for the object, and an affordance application parameter for the affordance for the spatial region. The method further includes determining that the affordance is a target affordance for the object. The method further includes, based on: the affordance being the target affordance, the affordance being defined for the spatial region, and the affordance application parameter being defined for the affordance for the spatial region: controlling one or more actuators of the robot to cause one or more components of the robot to interact with the spatial region of the object in conformance with the affordance application parameter.

This method and other implementations of technology disclosed herein may each optionally include one or more of the following features.

In some implementations, the affordance application parameter defines one or both of: a magnitude of the affordance and a direction for the affordance.

In some implementations, the affordance application parameter defines a force, an acceleration, a velocity, or an end effector approach pose of the affordance.

In some implementations, the output further defines a second spatial affordance of the multiple spatial affordances for the object. In some of those implementations, the second spatial affordance defines: the spatial region of the object, a second affordance for the spatial region of the object, and a second affordance application parameter for the second affordance for the spatial region.

In some implementations, the output further defines a second spatial affordance of the multiple spatial affordances for the object, and the second spatial affordance defines: a second spatial region of the object, the affordance for the second spatial region of the object, and a second affordance application parameter for the affordance for the second spatial region. In some of those implementations, a magnitude of the second affordance application parameter differs from a magnitude of the affordance application parameter. In some versions of those implementations, the spatial affordance further defines a first probability for the affordance for the spatial region, the second spatial affordance further defines a second probability for the affordance for the second spatial region, and the method further includes: selecting the spatial region over the second spatial region based on the first probability and the second probability. In those versions, controlling the one or more actuators of the robot to cause the one or more components of the robot to interact with the spatial region of the object is based on selecting the spatial region over the second spatial region.

In some implementations, a method may be provided that includes receiving vision data that is generated based on output from one or more vision sensors of a vision component viewing an object in an environment of a robot. The method further includes applying the vision data as input to at least one trained machine learning model, and processing the vision data using the trained machine learning model to generate output defining multiple spatial affordances for the object in the environment. The processing of the vision data is based on trained parameters of the trained machine learning model, and the output is generated directly by the processing of the vision data using the trained machine learning model. The spatial affordances each define a corresponding spatial region of the object, a corresponding affordance for the corresponding spatial region, and a corresponding probability that the corresponding affordance is achievable through interaction with the corresponding spatial region. The method further includes selecting a particular spatial region of the corresponding spatial regions. Selecting the particular spatial region is based on the corresponding affordance for the particular spatial region being a target affordance for the object, and is based on the corresponding probability satisfying a threshold. The method further includes: providing at least part of the selected particular region as input to an action planner for the target affordance; and controlling one or more actuators of the robot based on output generated by the action planner based on the at least part of the selected particular region.

In some implementations, a method may be provided that includes receiving vision data and applying the vision data as input to at least one trained neural network model. The vision data is generated based on output from one or more vision sensors of a vision component of a robot, and the vision data captures an object in an environment of the robot. The method further includes processing the vision data using the trained neural network model to generate output defining multiple spatial affordances for the object in the environment. The processing of the vision data is based on trained parameters of the trained neural network model, and the output is generated directly by the processing of the vision data using the trained neural network model. The output defines a first spatial affordance and a second spatial affordance, of the multiple spatial affordances for the object. The method further includes: determining that the second affordance is a target affordance for the object; and based on the second affordance being the target affordance and being defined for the second spatial region, controlling one or more actuators of the robot to cause one or more components of the robot to interact with the second spatial region of the object.

Other implementations may include a non-transitory computer readable storage medium storing instructions executable by a processor to perform a method such as one or more of the methods described above. Yet another implementation may include a system (e.g., a robot, a robot control system, and/or one or more other components) including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
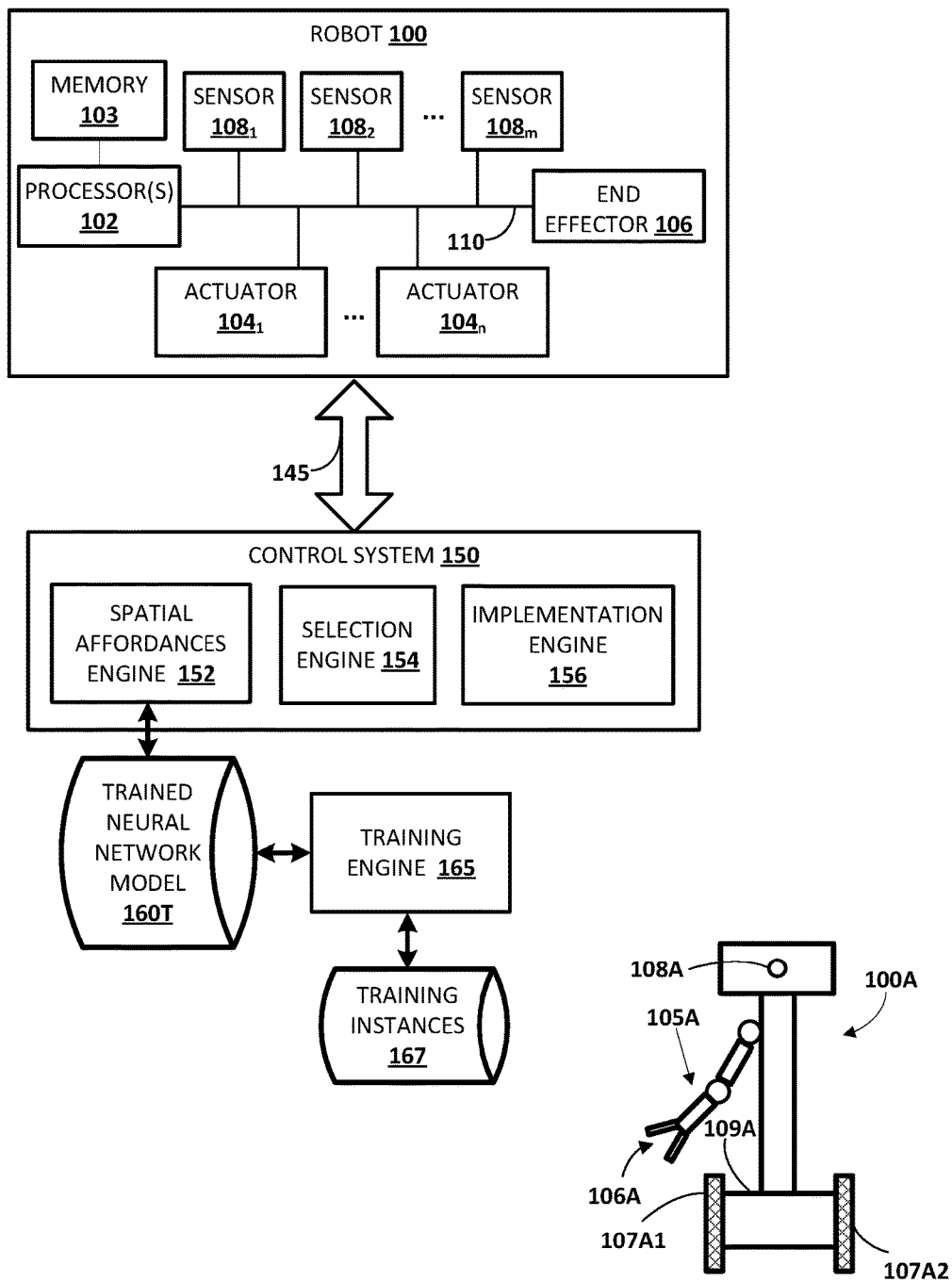
FIG. 1 illustrates an example environment in which implementations disclosed herein may be implemented.

FIG. 1 illustrates an example environment in which implementations disclosed herein may be implemented. A robot 100 is illustrated in FIG. 1. Robot 100 may take various forms, including but not limited to a telepresence robot, a robot arm, a humanoid, an animal, an insect, an aquatic creature, a wheeled device, a submersible vehicle, an unmanned aerial vehicle ("UAV"), and so forth. In various implementations, robot 100 may include one or more processors 102. Processor(s) 102 may take various forms, such as one or more CPUs, one or more GPUs, one or more field-programmable gate arrays ("FPGA"), and/or one or more application-specific integrated circuits ("ASIC"). In some implementations, the processor(s) 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, processor(s) 102 may be operably coupled with one or more actuators $104_{1-n}$, at least one end effector 106, and/or one or more sensors $108_{1-m}$, e.g., via one or more buses 110. The robot 100 may have multiple degrees of freedom and each of the actuators $104_{1-n}$ may control actuation of the robot 100 within one or more of the degrees of freedom responsive to control commands. The control commands are generated by one or more of the processor(s) 102 and provided to the actuators $104_{1-n}$ (e.g., via one or more of the buses 110) to control the robot 100. As described herein, various control commands can be generated based on spatial affordances determined according to techniques described herein. As used herein, "actuator" encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

As used herein, "end effector" may refer to a variety of tools that may be operated by robot 100 in order to accomplish various tasks. For example, some robots may be equipped with an end effector 106 that takes the form of a claw with two opposing "fingers" or "digits." Such a claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances.

Sensors $108_{1-m}$, may take various forms, including but not limited to vision components (e.g., laser scanners, stereographic cameras, monographic cameras), force sensors, pressure sensors, pressure wave sensors (e.g., microphones), proximity sensors (also referred to as "distance sensors"), torque sensors, bar code readers, radio frequency identification ("RFID") readers, accelerometers, gyroscopes, compasses, position sensors (e.g., odometer, a global positioning system), speedometers, edge detectors, and so forth. While sensors $108_{1-m}$, are depicted as being integral with robot 100, this is not meant to be limiting. In some implementations, sensors $108_{1-m}$, may be located external to, but may be in direct or indirect communication with, robot 100.

Also illustrated in FIG. 1, is a robot 100A, which is one non-limiting example of robot 100. The robot 100A includes robot arm 105A with a grasping end effector 106A, that takes the form of a gripper with two opposing actuable members. The robot 100A also includes a base 109A with wheels 107A1 and 107A2 provided on opposed sides thereof for locomotion of the robot 100A. The base 109A may include, for example, one or more motors for driving corresponding wheels 107A1 and 107A2 to achieve a desired direction, velocity, and/or acceleration of movement for the robot 100A.

The robot 100A also includes a vision component 108A. The vision component 108A includes one or more vision sensors and may be, for example, a stereographic camera, a monographic camera, or a laser scanner. Vision data described herein can be generated based on output from vision sensor(s) of the vision component 108A. For example, the output can be raw output from the vision sensor(s), or processed output. In some implementations, a stereographic camera includes two or more sensors (e.g., charge-coupled devices (CCDs)), each at a different vantage point. Vision data can be generated based on sensor data generated by the two sensors at a given instance, such as vision data that is a two-and-a-half-dimensional ("2.5D") (2D with depth) image, where each of the pixels of the 2.5D image defines an X, Y, and Z coordinate of a surface of a corresponding object, and optionally color values (e.g., R, G, B values) and/or other parameters for that coordinate of the surface. In some other implementations, a stereographic camera may include only a single sensor and one or more mirrors utilized to effectively capture sensor data from two different vantage points. A monographic camera can include a single sensor and captures two-dimensional ("2D") vision data. A laser scanner includes one or more lasers that emit light and one or more sensors that generate vision sensor data related to reflections of the emitted light. The vision data generated based on sensor output from a laser scanner may be 2.5D point cloud data. A laser scanner may be, for example, a time-of-flight laser scanner or a triangulation based laser scanner and may include a position sensitive detector (PSD) or other optical position sensor. In some implementations, vision data can be a voxel map as described herein. In some of those implementations, the voxel map is generated by processing of multiple instances of vision data. For example, multiple 2.5D images and/or multiple 2.5D instances of point cloud data from multiple different vantages can be processed to generate a voxel map of at least a portion of an environment of a robot.

As described herein, robot 100A may operate autonomously at least part of the time and control actuators thereof in performance of various actions. For example, in performing various actions, one or more processors of the robot 100A may provide control commands to actuators associated with the wheels 107A1 and/or 107A1, the robot arm 105A and/or the end effector 106A. Further, in various situations the control commands provided at a given instance can be generated based at least in part on spatial affordances as described herein.

Control system 150 is also illustrated in FIG. 1. Control system 150 includes a spatial affordances engine 152, a selection engine 154, and an implementation engine 156. Although the control system 150 is illustrated separate from the robot 100 in FIG. 1, connection arrow 145 indicates that the control system 150 can be implemented on robot 100 and/or can be in network communication (e.g., via a local area network and/or a wide area network) with robot 100. For example, in some implementations, one or more (e.g., all) of the engines of the control system 150 are implemented by hardware that is local to the robot 100, such as one or more of the processors 102. Such processor(s) that implement one or more of the engines may optionally be separate from the processor(s) that generate and/or provide control commands to actuators 104 of the robot 100. For example, aspects of the control system 150 may be implemented by one or more processors that do not operate in a real-time domain of the robot 100, whereas other processor(s) that do operate in the real-time domain generate and provide control commands to actuators $104_{1-n}$. In some implementations, one or more (e.g., all) of the engines of the control system 150 are implemented by hardware that is separate from the robot 100. For example, engine(s) may be implemented "in the cloud" by a remote cluster of high performance computing devices and/or by one or more computing devices that are separate from the robot 100, but that are geographically proximal to the robot (e.g., in the same building). In implementations where robot 100 and one or more aspects of control system 150 are separate, they may communicate over one or more wired or wireless networks (not depicted) or using other wireless technology, such as radio, Bluetooth, infrared, etc.

The spatial affordances engine 152 receives vision data that is generated based on output from one or more vision components of the sensors $108_{1-m}$. The spatial affordances engine 152 uses one or more trained neural network models 160T to process the received vision data to generate output that defines spatial affordances for one or more objects captured by the vision data. For example, the received vision data can be a 3D voxel map and the spatial affordances engine 152 can process the 3D voxel map using the trained neural network model 160T to generate output that defines multiple spatial affordances. The multiple spatial affordances can each define at least: a corresponding spatial region that corresponds to a portion of the voxel map (e.g., to a single voxel, or to a collection of contiguous voxels), and a corresponding affordance for the corresponding spatial region. In some implementations, an affordance of a spatial affordance is indicated by a probability, in the output, that corresponds to the spatial region and to the affordance. In some of those implementations, an affordance can be considered to be defined for a spatial affordance if the probability satisfies a threshold (e.g., a probability of greater than 0.3 where probabilities range from 0 to 1.0). As another example, the received vision data can be a 2D or 2.5D image, and the spatial affordances engine 152 can process the 2D or 2.5D image using one or more of the trained neural network model 160T to generate output that defines multiple spatial affordances. The multiple spatial affordances can each define at least: a corresponding spatial region that corresponds to a portion of the 2D or 2.5D image (e.g., to a single pixel, or to a collection of contiguous pixels), and a corresponding affordance for the corresponding spatial region.

The selection engine 154 selects a spatial affordance generated by the spatial affordances engine. The selection engine 154 can select a spatial affordance based on conformance of the selected spatial affordance to a target affordance, and/or based on other criteria such as other parameter(s) of the selected spatial affordance and/or task criteria.

A target affordance is an affordance to be performed by the robot. In some implementations, the target affordance is generated by one or more other components of the control system 150, such as a task planner, and/or is generated based on user interface input. For example, in performance of a "clean the dining table" task by a robot, a task planner can dictate that a "pick up" affordance needs to be performed for all items on a "dining table". Accordingly, the target affordance can be a pick up affordance. The selection engine 154 can then select one or more spatial affordances based on those spatial affordances defining a "pick up" affordance and optionally based on those spatial affordances defining a spatial region that is "atop" or otherwise close to an area classified as a "dining table" (e.g., classified by a separate object detection and localization engine). Additional or alternative criteria can optionally be utilized by the selection engine 154 in selecting the spatial affordances. For example, a spatial affordance can be selected based on a probability defined by the spatial affordance satisfying a threshold (e.g., a set threshold or a threshold relative to other spatial affordance(s)). Also, for example, a spatial affordance can be selected based on affordance application parameter(s) defined by the spatial affordance being achievable by the robot (e.g., a magnitude of force indicated by an affordance application parameter actually being achievable by the robot). For instance, the selection engine may not choose a candidate spatial affordance based on that candidate spatial affordance defining an affordance application parameter that is not achievable by the robot (e.g., the robot is incapable of applying a magnitude of force indicated by the affordance application parameter).

As another example, user interface input provided by a user can directly indicate a target affordance, or can be processed to determine the target affordance. The user interface input can be, for example, spoken user interface input provided via a microphone, of the sensors $108_1$, of the robot 100, and/or provided via a separate client computing device and transmitted to the control system 150 (optionally after pre-processing by the client computing device and/or other computing devices). For example, a user can provide spoken input of "open the drawer", and a target affordance of "open" can be determined based on the spoken input. The selection engine 154 can then select one or more spatial affordances based on those spatial affordances defining an "open" affordance and optionally based on those spatial affordances defining a spatial region that is "on" or otherwise close to an area classified as a "drawer" (e.g., classified by a separate object detection and localization engine).

The implementation engine 156 uses the selected spatial affordance to control actuators 104 of the robot 100. For example, the implementation engine 156 can control actuators 104 of the robot 100 to cause the actuators 104 to interact with all or portions of the spatial region defined by the selected spatial affordance in performing the affordance, and/or to perform the affordance based on an affordance application parameter defined by the selected spatial affordance. As one example, for a "push" affordance, the implementation engine 156 can determine a target area for the push and/or an approach vector for the push based on the spatial region defined by the selected spatial affordance. For instance, the implementation engine 156 can determine an approach vector for the push affordance based on one or more surface normals for the spatial region. A surface normal can be determined, for example, based on one or more vision data points that correspond to the spatial region.

In various implementations, the implementation engine 156 can include, and/or be in communication with, one or more action planners such as a path planner, a motion planner, a grasp planner, etc. In some of those implementations, the action planners can utilize the spatial region and/or other parameters of the spatial affordance as constraint(s) in planning a corresponding action. For example, a point of the spatial region can be utilized as a target point for an action planner and/or a direction and/or magnitude defined by the affordance application parameter can be utilized as a target direction and/or target magnitude for interaction with the target point.

The implementation engine 156 can provide control commands to one or more actuators of the robot to effectuate planned actions. For example, the implementation engine 156 can include a real-time module that generates real-time control commands to provide to actuators 104 of the robot 100 to effectuate one or more actions that have been determined based on selected spatial affordance(s).

Also illustrated in the environment of FIG. 1 is a training engine 165, and a training instances database 167. The trained neural network model(s) 160T can be trained by the training engine 165 utilizing training instances from training instances database 167.

Figures 2A, 2B:
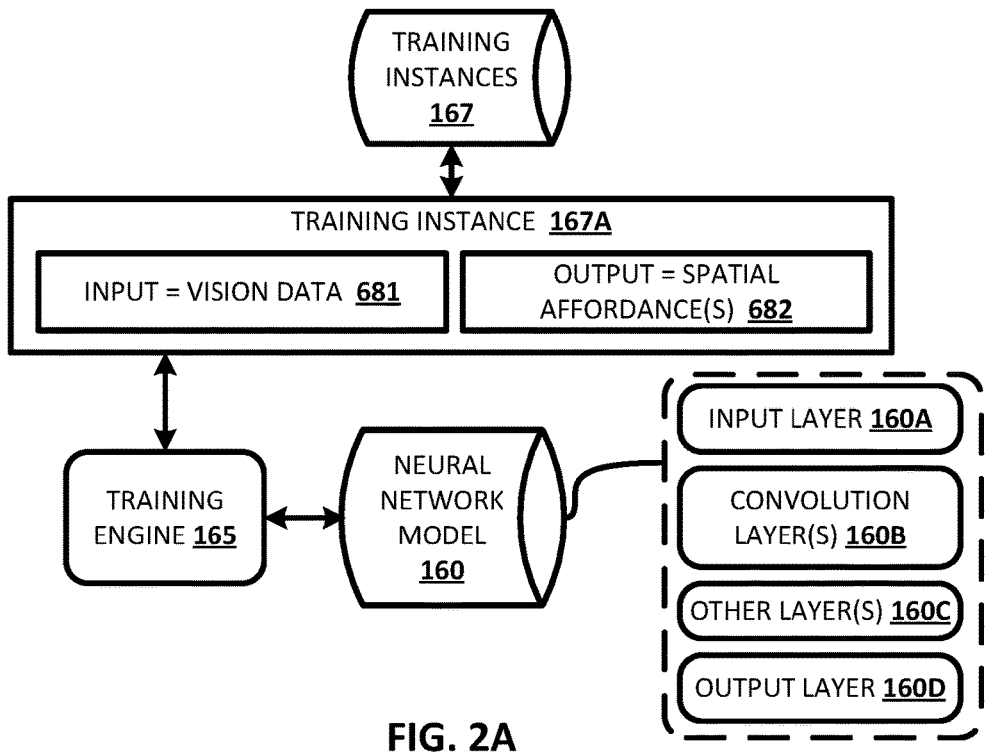
FIG. 2A illustrates an example of how a training engine can train a neural network model utilizing a training instance of training instances database of FIG. 1.
FIG. 2B illustrates an example of training instance output of the training instance of FIG. 2A.

With reference to FIGS. 2A and 2B, additional description is provided of the training engine 165, the training instances of the database 167, and the trained neural network model 160T. The trained neural network model is denoted with reference numeral 160 (without the "T") in FIG. 2B to indicate that, in the example of FIG. 2A, it is being trained prior to its usage in FIG. 1.

FIG. 2A illustrates an example training instance 167A of the training instances database 167, and how the training engine 165 can utilize the training instance to train the neural network model 160. The training instance 167A includes a training instance input 681 that includes vision data. The vision data of training instance input 681 can be, for example, a 2D image, a 2.5D image, or a 3D voxel map. For example, the vision data can be a 2.5D image captured by a stereo camera and have 512×512 pixels, with 4 channels. The 4 channels can define red, green, blue, and depth values for each of the pixels. As another example, the vision data can be a 3D voxel map generated based on sensor output captured by a stereo camera and/or laser scanner from multiple vantages.

The training instance 167A also includes a training instance output 682, that defines one or more spatial affordances for one or more objects captured by the vision data of the training instance input 681. One example of training instance output 682 is illustrated by training instance output 682A of FIG. 2B. Training instance output 682A defines a plurality of spatial regions denoted by "Region$_1$." through "Region$_N$," of FIG. 2B. Each of the spatial regions has a corresponding probability and corresponding application parameters defined for each of multiple affordances. For example, as illustrated in FIG. 2B, "Region$_1$." has a probability defined for a first affordance ("Affordance$_1$. Probability") and an affordance application parameter defined for the first affordance ("Affordance$_1$. Application Parameter"). Further, "Region$_1$." also has a probability and affordance application parameter defined for each of 2-N additional affordances (i.e., as indicated by the ellipsis and "Affordance$_N$ Probability" and "Affordance$_N$ Application Parameters). Likewise, probabilities and an affordance application parameter are defined for each of 2-N additional affordances for each of 2-N additional regions.

As one example, assume that for "Region$_1$.", "Affordance$_1$." is the only affordance achievable, and has an affordance application parameter that is a magnitude of force of 15 Newton. In such an example, the training example output for "Region$_1$." can include a vector of values of <1.0, 15, 0, 0, 0, . . . 0>, where "1.0" and "15" are the only non-zero values, and "1.0" represents a maximum probability, and "15" represents the force in Newton. The remaining zero values of the vector represent that the corresponding affordances are not defined for "Region$_1$." in the training instance output 682A. Thus, in such an example, the first position in the vector of values corresponds to the "Affordance$_1$. Probability", the second position corresponds to the "Affordance$_1$. Application Parameter", the third position corresponds to the "Affordance$_2$ Probability", the fourth position corresponds to the "Affordance$_2$ Application Parameter", and so forth. For instance, if the "N" in "Affordance$_N$" were equal to 10, then probabilities and affordance application parameters for 10 affordances would be described by the vector, and the vector would have a dimension of 20 (a probability and an affordance application parameter for each of the 10 affordances). It is noted that in such an example, each affordance is indicated by its corresponding probability, and its corresponding probability's position in the vector of values. Further, the corresponding probability defines whether the affordance is present in the spatial region (e.g., whether a spatial affordance is included in the training example that defines the affordance for the spatial region).

In some implementations, each of the spatial regions is defined by its dimensional position in the training instance output 682. For example, where the training instance output 682A defines a vector of values for each of the spatial regions, a first spatial region can correspond to the first vector of values, a second spatial region can correspond to the second vector of values, and so forth. In some of those and other implementations, each spatial region corresponds to a single pixel or a single voxel of the corresponding training instance input. For example, if the training instance input has a dimension of 256×256, with 4 channels, the training instance output 682A can have a dimension of 256×256, with 20 channels—where each 1×1×20 "stack" is a vector of values describing the affordances (e.g., via the affordance probabilities), affordance probabilities, and affordance application parameters for a corresponding single pixel or voxel. In some other implementations, each spatial region corresponds to a collection of pixels or voxels of the corresponding training instance input. For example, if the training instance input has a dimension of 256×256×4, the training instance output 682A can have a dimension of 64×64×20—where each 1×1×20 "stack" is a vector of values describing the affordances, affordance probabilities, and affordance application parameters for 4 contiguous pixels or voxels.

Turning again to FIG. 2A, in training the neural network model 160, the training engine 165 applies the training instance input 681 to the neural network model 160, and processes the training instance input 681, utilizing the neural network model 160 and based on current parameters of the neural network model 160, to generate an output having a dimension that conforms to the dimension of training instance output 682. The training engine 165 then compares the generated output to the training instance output 682, and updates one or more parameters of the neural network model 160 based on the comparison. For example, the training engine 165 can generate an error based on differences between the generated output and the training instance output 682, and backpropagate the error through the neural network model 160 to update the model. Although only a single training instance 167A is illustrated in FIG. 2A, neural network model 160 will be trained based on a large quantity of training instances of training instances database 167. Those training instances can collectively include training instance input with diverse vision data (e.g., multiple diverse objects, varied lighting/other environmental parameters, etc.) and training instance output with diverse spatial affordances. Moreover, although a non-batch training example is described, batch training may additionally or alternatively be utilized.

It is noted that in some implementations, the neural network model 160 is trained to predict, for each of a plurality of spatial regions of vision data, multiple probabilities that each indicate whether a corresponding one of multiple disparate affordances is achievable for the spatial region. For example, the neural network model 160 can be trained to predict, based on applied vision data, a first probability that a given spatial region has a "push" affordance, a second probability that the given spatial region has a "lift" affordance, a third probability that the given spatial region has a "rotate" affordance, a fourth probability that the given spatial region has an "open" affordance, etc. However, in some other implementations multiple neural network models may be trained and subsequently utilized in combination, with each being trained for only a subset of affordances (e.g., one or more being trained for only a single affordance).

FIG. 2A also illustrates, within dashed lines, example layers that may be included in neural network model 160. In particular, an input layer 160A, convolution layer(s) 160B, other layer(s) 160C, and an output layer 160D are illustrated. As described herein, the dimensions/shape of the input layer 160A can be dependent on the shape of the vision data to be applied. Also, the dimensions/shape of the output layer 160D can be dependent on the size of the spatial regions of the spatial affordances, whether affordance performance attributes are to be predicted, etc. In some implementations, multiple convolution layer(s) 160B are provided, and max pooling and/or other layers may optionally be interposed between one or more of the convolution layer(s) 160B. The other layer(s) 160C can include such max pooling layers and/or layers such as a softmax layer(s) and/or fully connected layer(s) that precede the output layer 160D.

Turning now to FIGS. 3A-3D, description is provided of various examples of spatial affordances that can be defined for a door 180, as well as how those can be utilized in generating training instances and/or how those may influence, at run time, generation and/or utilization of spatial affordances.

Figure 3A:
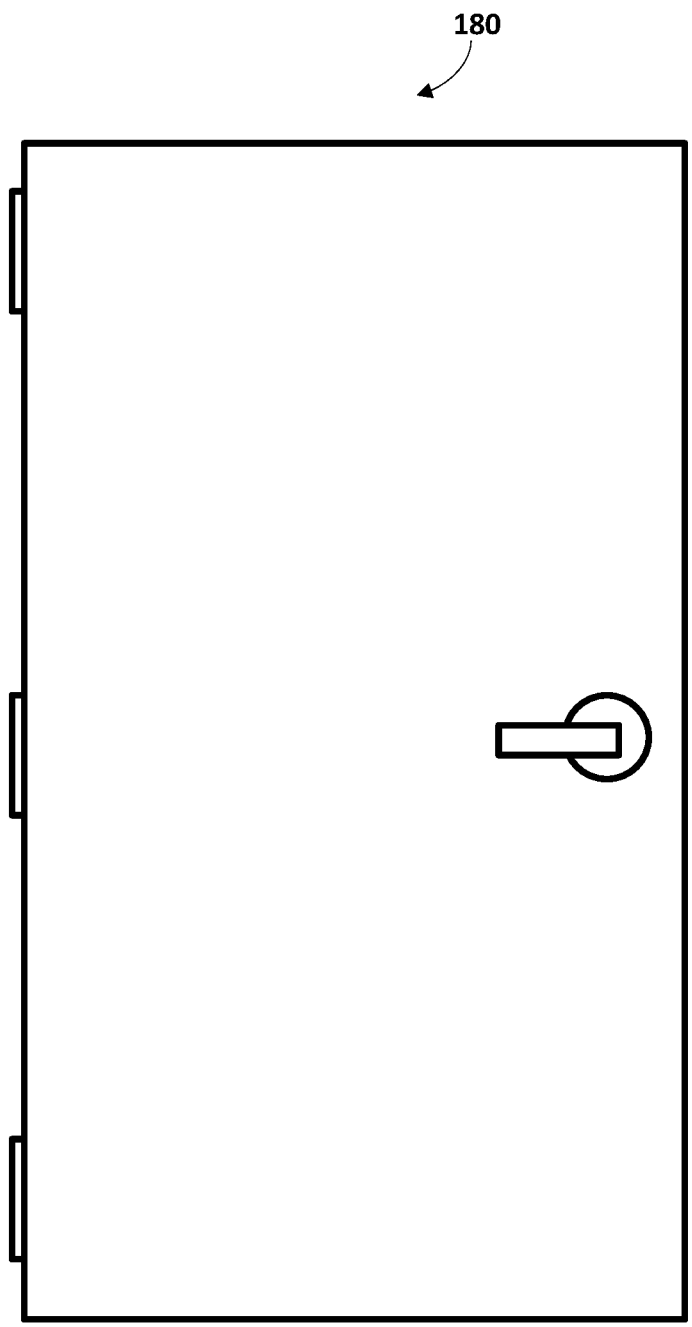
FIG. 3A illustrates a door that can be captured by vision data.
Figure 3B:
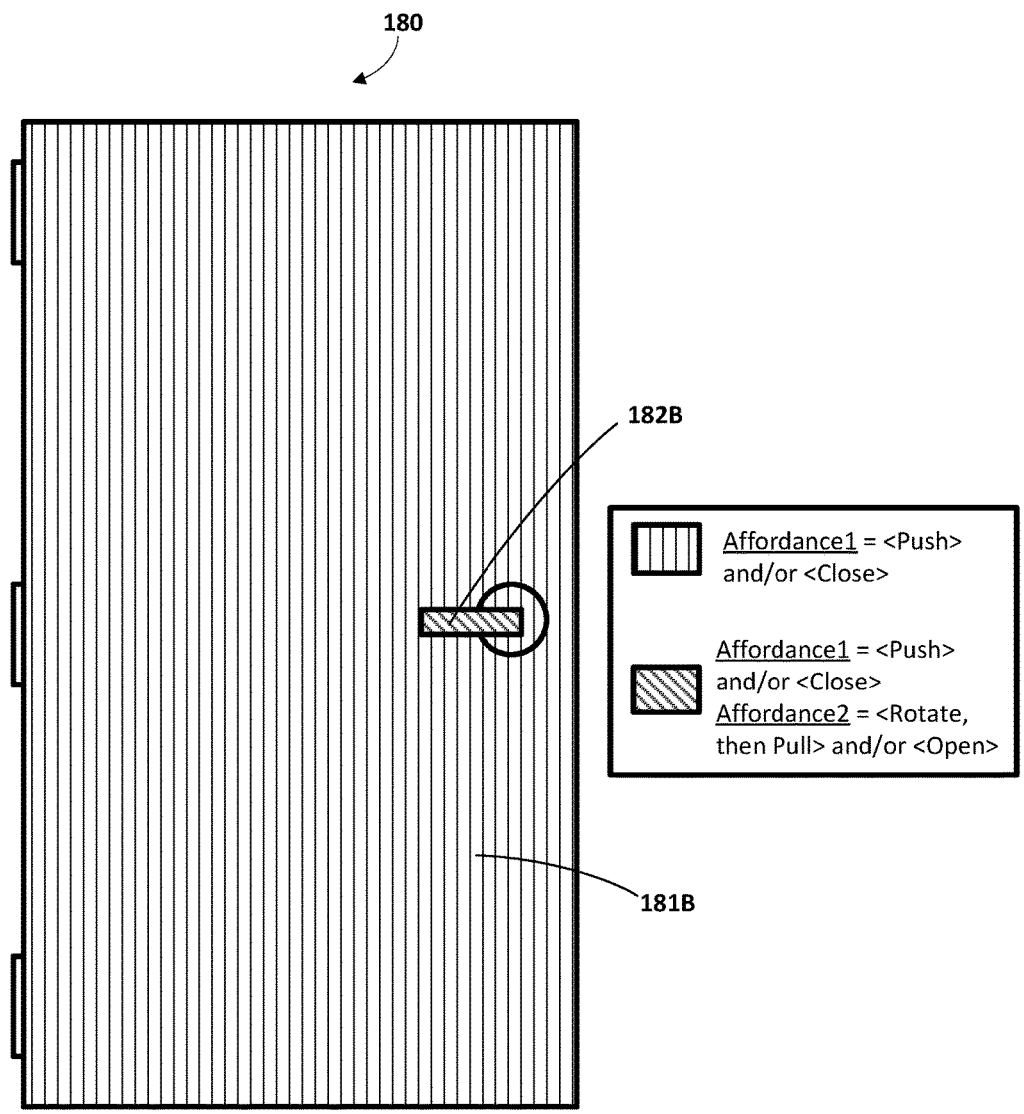
FIGS. 3B, 3C, and 3D each illustrates an example of spatial affordances that can be defined for the door of FIG. 3A.

The door 180 is illustrated in FIG. 3A without any indications of spatial affordances. In FIG. 3B, "vertical line" shading 181B indicates those areas of the door 180 for which a "push" and/or "close" affordance can be defined. In other words, those areas of the door 180 that can be pushed to close the door 180. The "diagonal line" shading 182B indicates those areas of the door 180 for which a "push" and/or "close" affordance can be defined—and for which a "rotate, then pull" and/or an "open" affordance can be defined. In particular, the handle of the door 180 can be pushed to close the door—and can be rotated, then pulled to open the door 180.

The affordances indicated by FIG. 3B can be defined in training instance output of a training instance that includes training instance input of vision data that captures the door 180. For example, the vision data can be a 2.5D image, and a user can utilize user interface input device(s) of a client computing device to manually annotate spatial regions of the 2.5D image that include only "Affordance1" (the vertical line shading 181B), and to manually annotate the separate spatial regions that include both "Affordance 1" and "Affordance2" (the diagonal line shading 182B). For example, the user can utilize user interface input device(s) to draw bounding boxes (or other shapes) to indicate the different affordances for the various spatial regions. As described herein, the size of the spatial regions defined by spatial affordances of training instance output can vary from implementation to implementation (e.g., it can be dependent on defined output dimensions of the neural network model). For example, in some implementations, each spatial region can correspond to a single pixel of the 2.5D image. For instance, the 2.5D image may capture the door 180 and other objects that are near the door 180. For each pixel of the 2.5D image that captures a vertical line shading 181B portion, the training instance output can indicate that Affordance1 is present for that pixel, but Affordance2 is absent. For instance, the training instance output can define, for each pixel that captures a vertical line shading 181B portion, a probability of "1.0" for a value corresponding to "Affordance1" to indicate that "Affordance1" is present—and can define a probability of "0" for a value corresponding to "Affordance2" to indicate that "Affordance2" is absent. For each pixel of the 2.5D image that captures a diagonal line shading 182B portion, the training example output can indicate that Affordance1 is present for that pixel, and that Affordance 2 is also present for that pixel. Any additional affordances indicated in the training instance output can optionally be indicated as absent for all of the pixels that correspond to the door.

Figure 3C:
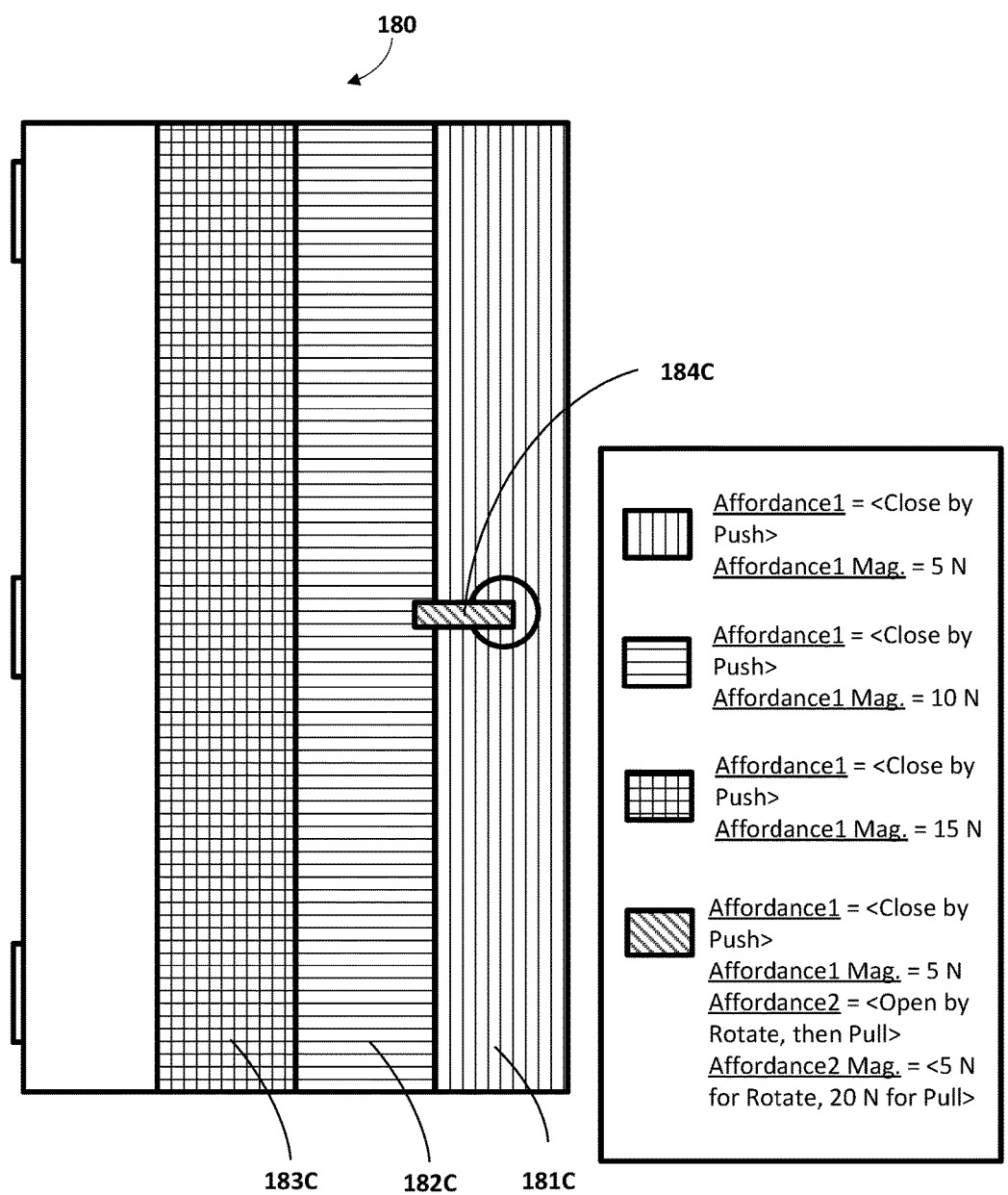

In FIG. 3C, "vertical line" shading 181C, "horizontal line" shading 182C, and "hatch shading" 183C each indicate areas of the door 180 for which a "close by push" affordance can be defined. However, the different shadings 181C, 182C, and 183C indicate different affordance application parameters. In particular, shading 181C indicates a magnitude of 5 N for the "close by push" affordance, shading 182C indicates a magnitude of 10 N for the "close by push" affordance", and the shading 183C indicates a magnitude of 15 N for the "close by push" affordance.

The "diagonal line" shading 184C indicates those areas of the door 180 for which a "close by push" affordance can be defined, and indicates a magnitude of 5 N for the "close by push" affordance. The shading 184C further indicates that an "open by rotate, then pull" affordance can also be defined, and indicates a magnitude of 5 N for the "rotate" portion of the affordance, and a magnitude of 20 N for the "pull" portion of the affordance.

The affordances and corresponding magnitudes indicated by FIG. 3C can be defined in training instance output of a training instance that includes training instance input of vision data that captures the door. For example, a user can utilize user interface input device(s) of a client computing device to manually annotate the various affordances and corresponding magnitudes for various spatial regions of the 2.5D image. For example, for each spatial region that captures a vertical line shading 181C portion, the training instance output can indicate that Affordance1 is present for that spatial region and has a magnitude of 5 N, but Affordance 2 is absent and that Affordance 2 lacks any magnitude for that spatial region. Also, for example, for each spatial region that captures a diagonal line shading 184C portion, the training instance output can indicate: that Affordance1 is present for that spatial region and has a magnitude of 5 N: Affordance2 is present for that spatial region and has a magnitude of 5 N for a rotate portion of Affordance 2, and has a magnitude of 20 N for a pull portion of Affordance2.

A neural network model trained based on such training examples with affordances and corresponding magnitudes can enable prediction, on a spatial region by spatial region basis, of affordance(s) and corresponding magnitudes for each of a plurality of spatial regions. For example, output generated based on vision sensor data that captures a new unique door can indicate, for each of a plurality of spatial regions of the new door, a probability that Affordance1 is achievable for the spatial region, a predicted magnitude for Affordance 1 for the spatial region, a probability that Affordance 2 is achievable for the spatial region, a predicted magnitude for Affordance 2 for the spatial region, and optionally probabilities for additional Affordances for the spatial region and corresponding magnitudes for the spatial region. Although particular magnitudes of force are illustrated in FIG. 3C, additional and/or alternative affordance application parameters can be defined such as, for example, velocities, accelerations, end effector approach poses, paths, and/or trajectories.

Figure 3D:
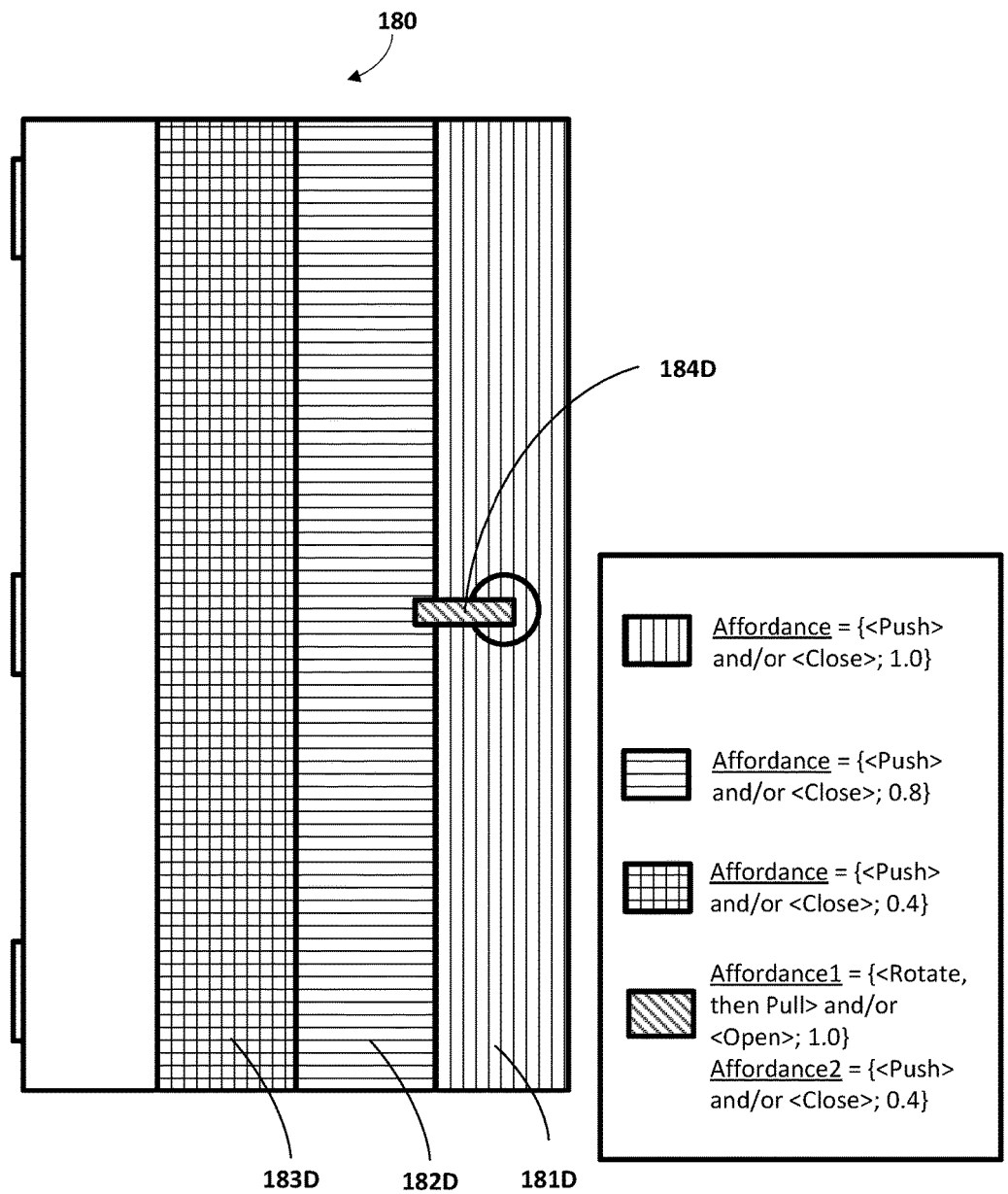

In FIG. 3D, "vertical line" shading 181D, "horizontal line" shading 182D, and "hatch shading" 183D each indicate areas of the door 180 for which a "close by push" affordance can be defined. However, the different shadings 181D, 182D, and 183D indicate different probabilities for the "close by push" affordance. In particular, shading 181D indicates a probability of "1.0" for the "close by push" affordance, shading 182D indicates a probability of "0.8" for the "close by push" affordance", and the shading 183D indicates a probability of "0.4" for the "close by push" affordance.

The "diagonal line" shading 184D indicates those areas of the door 180 for which a "close by push" affordance can be defined, and indicates a probability of "0.4" for the "close by push" affordance. The shading 184D further indicates that an "open by rotate, then pull" affordance can also be defined, and indicates a probability of "1.0" for the "open by rotate, then pull" affordance.

The affordances and corresponding probabilities indicated by FIG. 3D can be defined in training instance output of a training instance that includes training instance input of vision data that captures the door. For example, a user can utilize user interface input device(s) of a client computing device to manually annotate the various affordances and corresponding probabilities for various spatial regions of the 2.5D image. For example, for each spatial region that captures a vertical line shading 181D portion, the training instance output can indicate that Affordance1 is present for that spatial region and has a probability of 1.0 for that spatial region, but Affordance 2 is absent. It is noted that in some implementations the presence/absence of an affordance and the probability can be indicated by a single value in the training instance output. For example, a zero/null value can indicate absence, and a non-zero/null value can indicate presence, with the magnitude of the non-zero/null value being proportional to a corresponding probability. A neural network model trained based on such training examples with affordances and corresponding magnitudes can enable prediction, on a spatial region by spatial region basis, of affordance(s) and corresponding probabilities for each of a plurality of spatial regions. Training instance outputs generated based on the affordances and corresponding probabilities indicated by FIG. 3D can vary from those generated based on the affordances indicated by FIG. 3B, in that in FIG. 3B binary present/absent values can be utilized to indicate presence/absence of a corresponding affordance, whereas in FIG. 3D a range of present values can be utilized (where a magnitude of a present value is based on the corresponding probability).

Figure 4A:
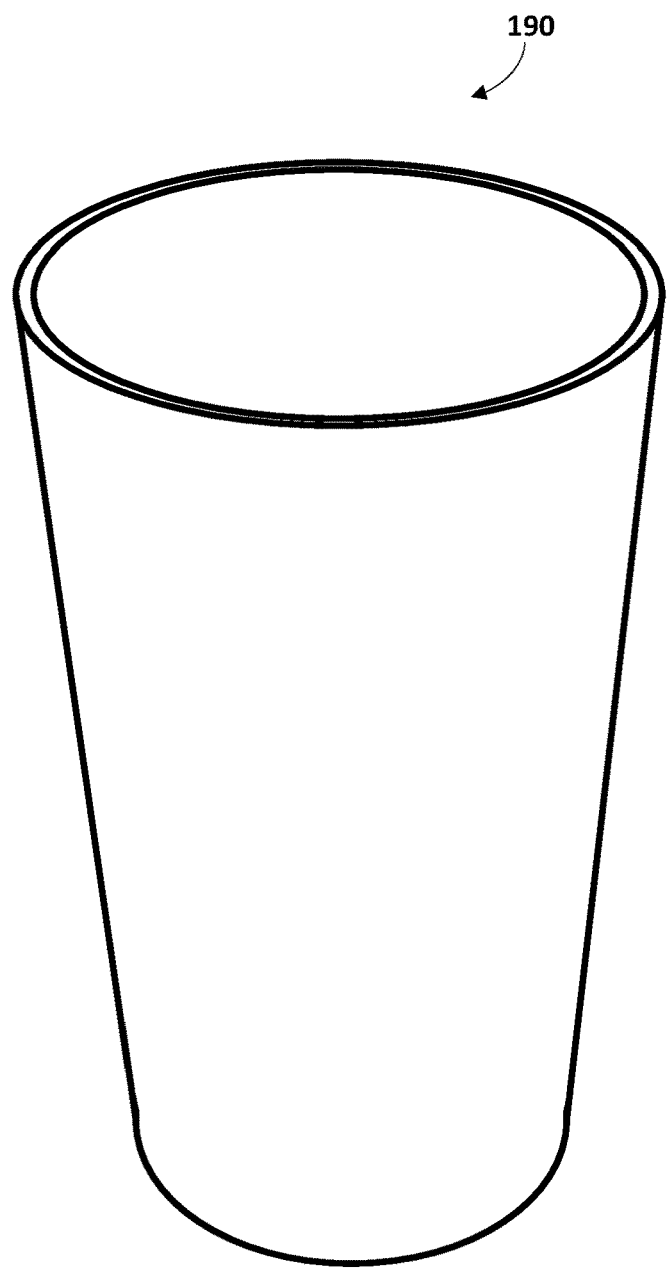
FIG. 4A illustrates a cup that can be captured by vision data.
Figure 4B:
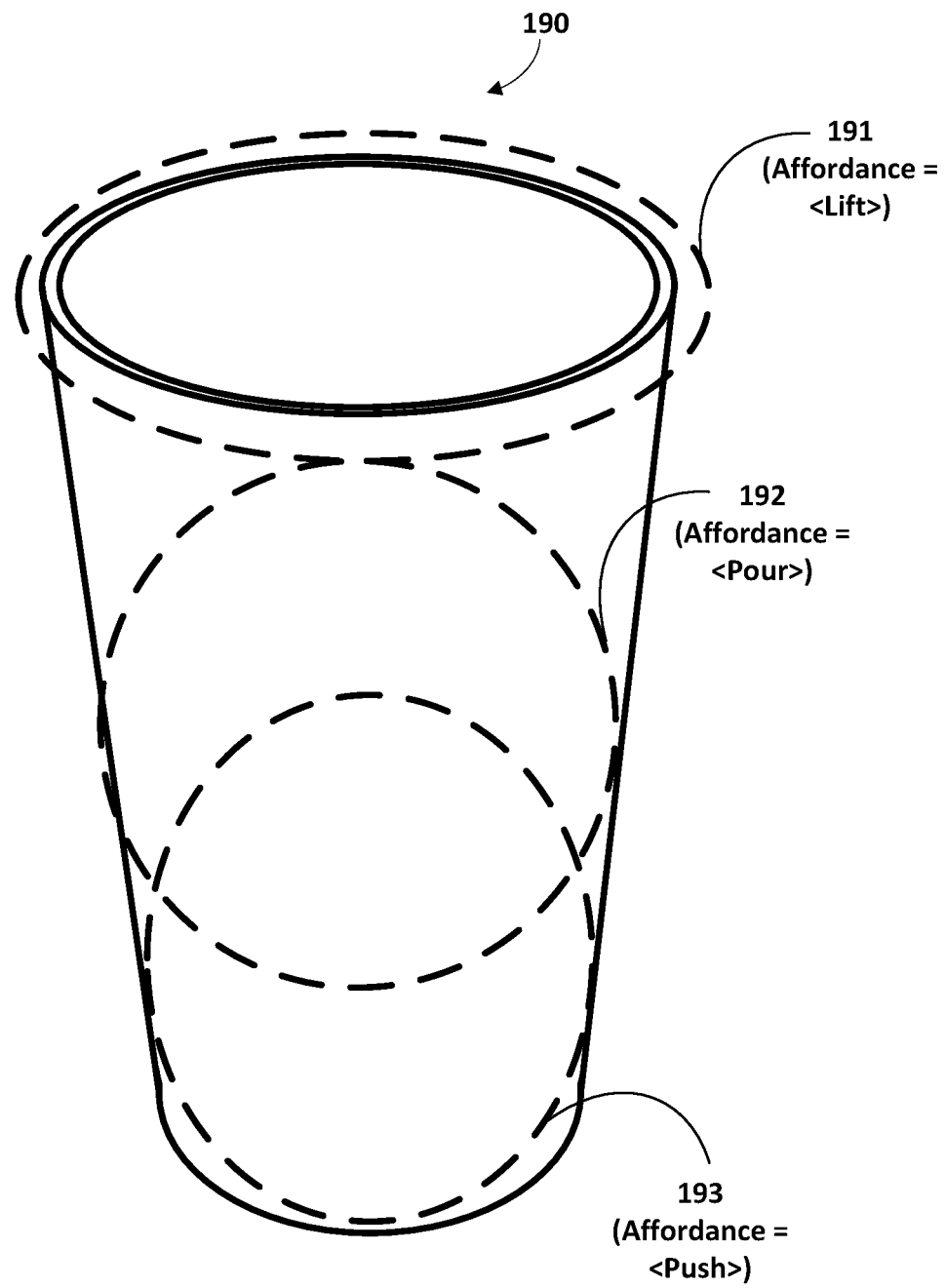
FIG. 4B illustrates an example of spatial affordances that can be defined for the cup of FIG. 4A.

Turning now to FIGS. 4A and 4B, description is provided of various examples of spatial affordances that can be defined for a cup 190, as well as how those can be utilized in generating training instances and/or how those may influence generation and/or utilization of spatial affordances.

The cup 190 is illustrated in FIG. 4A without any indications of spatial affordances. In FIG. 4B, three ellipsoids 191, 192, and 193 enclose various areas of the cup. Those areas bound by ellipsoid 191 indicate areas of the cup 190 for which a "lift" affordance (e.g., grasp and then raise) can be defined. For example, in "lifting" the cup 190 it may be desirable to grasp near the rim of the cup 190 so that a firm grasp can be achieved. Those areas bound by ellipsoid 192 indicate areas of the cup 190 for which a "pour" affordance can be defined. For example, in pouring liquid out of the cup 190, it may be more desirable to grasp the cup 190 near the indicated regions to minimize risk of early spillage when pouring and/or to minimize the risk of robotic components getting wet. Those areas bound by ellipsoid 192 indicate areas of the cup 190 for which a "push" affordance can be defined. For example, it may be desirable to push the cup below its center of gravity to minimize the risk of tipping.

The affordances indicated by FIG. 4B can be defined in training instance output of a training instance that includes training instance input of vision data that captures the cup 190. For example, a user can utilize user interface input device(s) of a client computing device to manually annotate the various affordances for various spatial regions of the vision data. For example, for each spatial region that captures a portion of the cup bounded by only the ellipsoid 192, the training instance output can indicate that a "pour" affordance is present for that spatial region, but that "lift", "push" and/or other affordances are absent for that spatial region. Also, for example, for each spatial region that captures a portion of the cup bounded by both the ellipsoid 192 and the ellipsoid 193 (i.e., those portions where the ellipsoids 192 and 193 overlap), the training instance output can indicate that a "pour" affordance and a "push" affordance are present for that spatial region, but that a "lift" and/or other affordances are absent for that spatial region. A neural network model trained based on such training examples with affordances and corresponding magnitudes can enable prediction, on a spatial region by spatial region basis, of affordance(s) and corresponding probabilities for each of a plurality of spatial regions.

Figure 5:
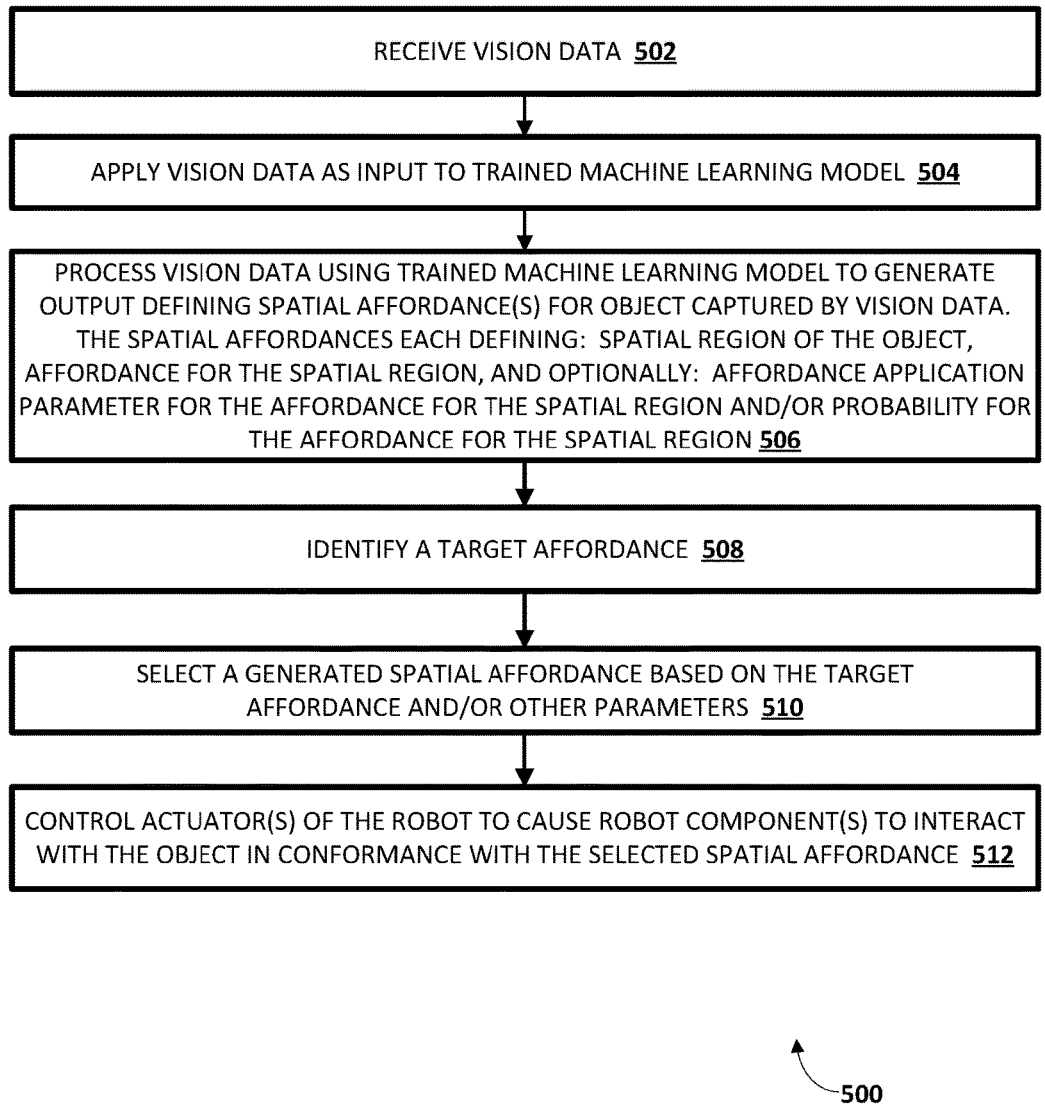
FIG. 5 is a flowchart illustrating an example method of generating and utilizing spatial affordances according to implementations disclosed herein.

Referring now to FIG. 5, an example method 500 of generating and utilizing spatial affordances is described. For convenience, the operations of the method 500 are described with reference to a system that performs the operations. This system may include various components of a robot and/or of one or more computing devices in communication with the robot. Moreover, while operations of method 500 are shown in a particular order, this is not meant to be limiting. One or more operations may be reordered, omitted or added.

At block 502, the system receives vision data. The vision data can be generated based on output from one or more vision sensors of a vision component of a robot, and captures an object in the environment of the robot.

At block 504, the system applies the vision data as input to a trained machine learning model. For example, the system can apply the vision data as input to a trained neural network model, such as trained neural network model 160T of FIG. 1.

At block 506, the system processes the vision data using the trained machine learning model to generate output defining spatial affordance(s) for an object captured by the vision data. The spatial affordances can each define: a spatial region of the object, an affordance for the spatial region, and optionally: an affordance application parameter for the affordance for the spatial region, and/or a probability for the affordance for the spatial region.

At block 508, the system identifies a target affordance. In some implementations, the target affordance is generated by one or more other components of the system, such as a task planner, and/or is generated based on user interface input.

At block 510, the system selects a generated spatial affordance based on the target affordance and/or other parameters. The other parameters based on which the system selects a generated spatial affordance can include, for example, a probability defined by the spatial affordance satisfying a threshold (e.g., a set threshold or a threshold relative to other spatial affordance(s)) and/or affordance application parameter(s) defined by the spatial affordance being achievable by the robot (e.g., a magnitude of force indicated by an affordance application parameter actually being achievable by the robot). The other parameters based on which the system selects a generated spatial affordance can additionally or alternatively include one or more criteria associated with the target affordance, such as location criteria. For example, the system can select the generated spatial affordance based on it being in an area defined as an area of interest for the target affordance. For instance, the target affordance can be "pick up" and associated with a criterion of objects that are "on a table"—and the generated spatial affordance selected based on it being in an area that is atop, and/or near, an area classified as a table.

At block 512, the system controls actuator(s) of the robot to cause robot component(s) to interact with the object in conformance with the selected spatial affordance. For example, the system can provide one or more points of the spatial region, of the selected spatial affordance, as a target point to a motion planner, and the motion planner can generate a trajectory based on the target point and/or one or more other criteria. The system can then generate control commands to effectuate the trajectory. As another example, the system can utilize surface normal(s) of the spatial region, of the selected spatial affordance, to determine an approach vector for an end effector of the robot. The system can then generate control commands to cause the approach vector followed by the end effector.

Figure 6:
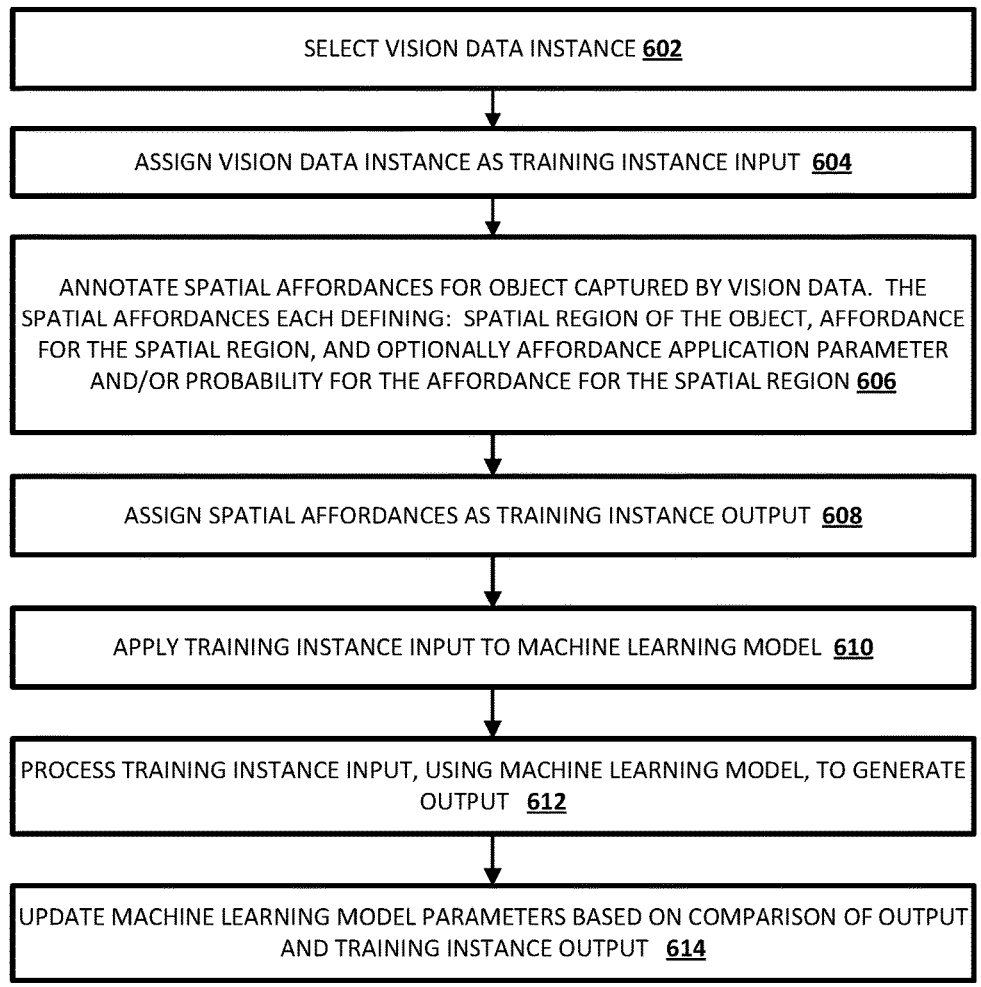
FIG. 6 is a flowchart illustrating an example method of generating training instances and utilizing the training instances to train a machine learning model according to implementations disclosed herein.

Referring now to FIG. 6, an example method 600 of generating training instances and utilizing the training instances to train a machine learning model is described. For convenience, the operations of the method 600 are described with reference to a system that performs the operations. This system may include various components of a robot and/or of one or more computing devices in communication with the robot. Moreover, while operations of method 600 are shown in a particular order, this is not meant to be limiting. One or more operations may be reordered, omitted or added.

At block 602, the system selects a vision data instance.

At block 604, the system assigns the vision data instance as training instance input of a training instance.

At block 606, the system annotates spatial affordances for an object captured by the vision data. The spatial affordances each define: a spatial region of the object, an affordance for the spatial region, and optionally an affordance application parameter and/or probability for the affordance for the spatial region. In some implementations, the system annotates the spatial affordances based on user interface input provided by a user via a computing device in manually annotating the spatial affordances in the vision data.

At block 608, the system assigns the spatial affordances as training instance output of the training instance.

At block 610, the system applies the training instance input to a machine learning model, such as the neural network model 160 of FIG. 2A.

At block 612, the system processes the training instance input, using the machine learning model, to generate output.

At block 614, the system updates the machine learning model parameters based on comparison of the output generated at block 612 to the training instance output of block 608. For example, the system can generate an error based on differences between the generated output and the training instance output of the training instance, and backpropagate the error through the machine learning model to update the model. Although method 600 is described with respect to a single training instance, it is understood that the machine learning model will be trained based on a large quantity of training instances (e.g., thousands of training instances).

Figure 7:
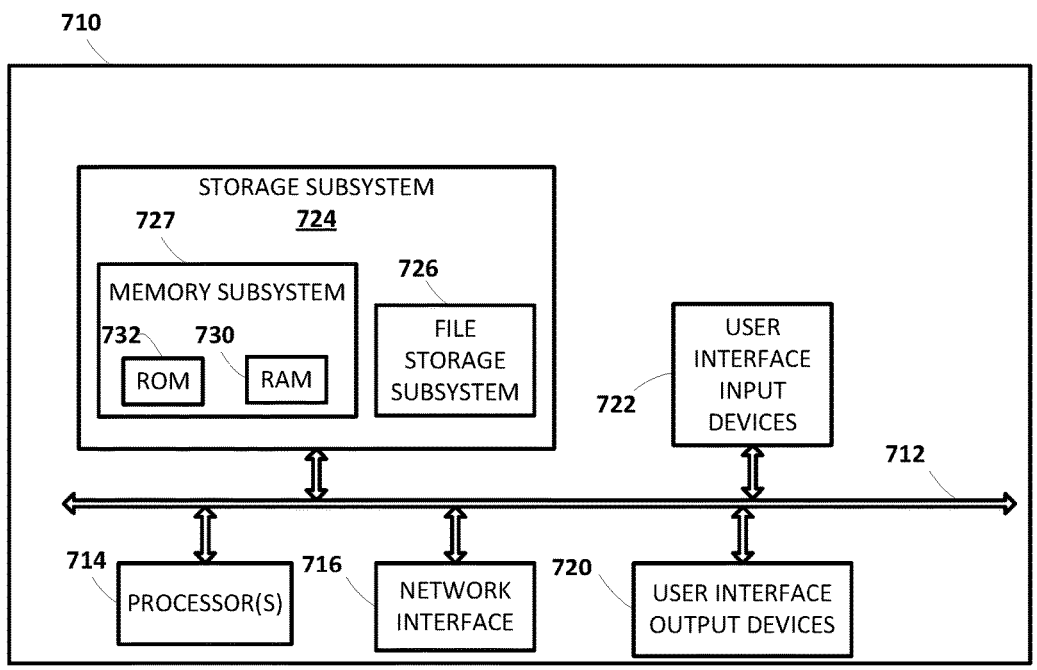
FIG. 7 illustrates an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 727 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500, method 600, and/or to implement one or more aspects of robot 100 or control system 170. Memory 727 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
receiving vision data, the vision data generated based on output from one or more vision sensors of a vision component of a robot, the vision data capturing an object in an environment of the robot;
applying the vision data as input to at least one trained machine learning model;
processing the vision data using the trained machine learning model to generate output defining multiple spatial affordances for the object in the environment, the processing of the vision data being based on trained parameters of the trained machine learning model, and the output being generated directly by the processing of the vision data using the trained machine learning model,
wherein the output defines a first spatial affordance and a second spatial affordance, of the multiple spatial affordances for the object,
wherein the first spatial affordance defines: a first spatial region of the object, and a first affordance for the first spatial region of the object,
wherein the second spatial affordance defines: a second spatial region of the object, and a second affordance for the second spatial region of the object,
wherein the first spatial region and the second spatial region are distinct regions of the object, and
wherein the first affordance is not defined for the second spatial region by the generated spatial affordances;
determining that the second affordance is a target affordance for the object; and
based on the second affordance being the target affordance and being defined for the second spatial region, controlling one or more actuators of the robot to cause one or more components of the robot to interact with the second spatial region of the object.

2. The method of claim 1, wherein the vision data comprises a plurality of pixels or voxels, and wherein the first spatial region defines a first pixel or first voxel of the plurality of pixels or voxels and the second spatial region defines a second pixel or voxel of the plurality of pixels or voxels.

3. The method of claim 2, wherein the first spatial region defines only the first pixel or voxel and the second spatial region defines only the second pixel or voxel.

4. The method of claim 2, wherein the first spatial region defines a first collection of contiguous pixels or voxels that include the first pixel or voxel, and wherein the second spatial region defines a second collection of contiguous pixels or voxels that include the first pixel or voxel and that exclude the second pixel or voxel.

5. The method of claim 1, wherein the first spatial affordance further defines an affordance application parameter for the first affordance for the first spatial region.

6. The method of claim 5, wherein the affordance application parameter defines at least one magnitude of force to be applied in performance of the first affordance for the first spatial region.

7. The method of claim 1, wherein the output further defines a third spatial affordance of the multiple spatial affordances for the object, wherein the third spatial affordance defines: the first spatial region of the object, and a third affordance for the first spatial region of the object.

8. The method of claim 1, wherein the second spatial affordance defines the second affordance for the second spatial region based on the output including a probability, that corresponds to the second spatial region and to the second affordance, satisfying a first threshold.

9. The method of claim 8, wherein controlling the one or more actuators of the robot to cause one or more components of the robot to interact with the second spatial region of the object is further based on determining that the probability satisfies one or more criteria relative to other probabilities that correspond to other spatial regions and to the second affordance.

10. The method of claim 1, wherein the first affordance is not defined for the second spatial region by the generated spatial affordances based on the output including a probability, that corresponds to the second spatial region and to the first affordance, failing to satisfy a threshold.

11. The method of claim 1, wherein the trained machine learning model is a feed forward neural network model comprising a plurality of convolution layers.

12. A method implemented by one or more processors, comprising:
receiving vision data, the vision data generated based on output from one or more vision sensors of a vision component viewing an object in an environment of a robot;
applying the vision data as input to at least one trained machine learning model;
processing the vision data using the trained machine learning model to generate output defining at least one spatial affordance for the object in the environment, the processing of the vision data being based on trained parameters of the trained machine learning model, and the output being generated directly by the processing of the vision data using the trained machine learning model,
wherein the at least one spatial affordance defines: a spatial region of the object, an affordance for the spatial region for the object, and an affordance application parameter for the affordance for the spatial region;
determining that the affordance is a target affordance for the object,
wherein the affordance application parameter defines one or multiple of: a magnitude of the affordance, a direction for the affordance, a force, an acceleration, a velocity, and an end effector approach pose of the affordance; and
based on: the affordance being the target affordance, the affordance being defined for the spatial region, and the affordance application parameter being defined for the affordance for the spatial region:
controlling one or more actuators of the robot to cause one or more components of the robot to interact with the spatial region of the object in conformance with the affordance application parameter.

13. The method of claim 12, wherein the affordance application parameter defines one or both of: the magnitude of the affordance and the direction for the affordance.

14. The method of claim 12, wherein the affordance application parameter defines the force, the acceleration, the velocity, or the end effector approach pose of the affordance.

15. The method of claim 12, wherein the output further defines a second spatial affordance for the object.

16. The method of claim 15, wherein the second spatial affordance defines: the spatial region of the object, a second affordance for the spatial region of the object, and a second affordance application parameter for the second affordance for the spatial region.

17. The method of claim 15, wherein the second spatial affordance defines: a second spatial region of the object, the affordance for the second spatial region of the object, and a second affordance application parameter for the affordance for the second spatial region, wherein a magnitude of the second affordance application parameter differs from the magnitude of the affordance application parameter.

18. The method of claim 17, wherein the at least one spatial affordance further defines a first probability for the affordance for the spatial region, wherein the second spatial affordance further defines a second probability for the affordance for the second spatial region, and further comprising:

selecting the spatial region over the second spatial region based on the first probability and the second probability;

wherein controlling the one or more actuators of the robot to cause the one or more components of the robot to interact with the spatial region of the object is based on selecting the spatial region over the second spatial region.

19. A method implemented by one or more processors, comprising:

receiving vision data, the vision data generated based on output from one or more vision sensors of a vision component viewing an object in an environment of a robot;

applying the vision data as input to at least one trained machine learning model;

processing the vision data using the trained machine learning model to generate output defining multiple spatial affordances for the object in the environment, the processing of the vision data being based on trained parameters of the trained machine learning model, and the output being generated directly by the processing of the vision data using the trained machine learning model, wherein the spatial affordances each define a corresponding spatial region of the object, a corresponding affordance for the corresponding spatial region, and a corresponding probability that the corresponding affordance is achievable through interaction with the corresponding spatial region;

selecting a particular spatial region of the corresponding spatial regions, wherein selecting the particular spatial region is based on the corresponding affordance for the particular spatial region being a target affordance for the object, and is based on the corresponding probability satisfying a threshold;

providing at least part of the selected particular region as input to an action planner for the target affordance; and controlling one or more actuators of the robot based on output generated by the action planner based on the at least part of the selected particular region.

20. A method implemented by one or more processors, comprising:

receiving vision data, the vision data generated based on output from one or more vision sensors of a vision component viewing an object in an environment of a robot;

applying the vision data as input to at least one trained machine learning model;

processing the vision data using the trained machine learning model to generate output defining multiple spatial affordances for the object in the environment, the processing of the vision data being based on trained parameters of the trained machine learning model, and the output being generated directly by the processing of the vision data using the trained machine learning model, wherein a first spatial affordance of the multiple spatial affordances defines: a first spatial region of the object, a first affordance for the first spatial region for the object, and a first affordance application parameter for the first affordance for the first spatial region, and wherein a second spatial affordance of the multiple spatial affordances defines: a second spatial region of the object, a second affordance for the second spatial region for the object, and a second affordance application parameter for the second affordance for the second spatial region;

determining that the first affordance is a target affordance for the object; and based on: the first affordance being the target affordance, the first affordance being defined for the first spatial region, and the first affordance application parameter being defined for the first affordance for the first spatial region:

controlling one or more actuators of the robot to cause one or more components of the robot to interact with the first spatial region of the object in conformance with the first affordance application parameter.

* * * * *